US 8,682,105 B2

(12) United States Patent
Kawahara

(10) Patent No.: US 8,682,105 B2
(45) Date of Patent: Mar. 25, 2014

(54) IMAGE PROCESSING METHOD AND IMAGE PROCESSING APPARATUS FOR COMBINING THREE OR MORE IMAGES, AND ELECTRONIC CAMERA HAVING IMAGE PROCESSING APPARATUS FOR COMBINING THREE OR MORE IMAGES

(75) Inventor: Kazuto Kawahara, Sagamihara (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/452,224

(22) Filed: Apr. 20, 2012

(65) Prior Publication Data
US 2012/0206624 A1    Aug. 16, 2012

Related U.S. Application Data

(63) Continuation of application No. 13/067,772, filed on Jun. 24, 2011, now abandoned, which is a continuation of application No. 12/068,431, filed on Feb. 6, 2008, now abandoned.

(30) Foreign Application Priority Data

Feb. 15, 2007  (JP) ................................. 2007-034912

(51) Int. Cl.
*G06K 9/36* (2006.01)
*G09G 5/02* (2006.01)

(52) U.S. Cl.
USPC ............................ 382/284; 345/634; 345/639

(58) Field of Classification Search
USPC .................... 382/284; 345/639, 634; 348/584
See application file for complete search history.

(56) References Cited

U.S. PATENT DOCUMENTS

| | | | |
|---|---|---|---|
| 5,097,327 | A | 3/1992 | Hasebe |
| 5,594,469 | A | 1/1997 | Freeman et al. |
| 5,721,692 | A | 2/1998 | Nagaya et al. |
| 6,005,638 | A | 12/1999 | Blair et al. |
| 6,385,245 | B1 * | 5/2002 | De Haan et al. ......... 375/240.16 |
| 2006/0088191 | A1 | 4/2006 | Zhang et al. |
| 2006/0182311 | A1 | 8/2006 | Lev |
| 2006/0238653 | A1 | 10/2006 | Tobita |
| 2008/0292194 | A1 * | 11/2008 | Schmidt et al. ............... 382/217 |
| 2009/0116043 | A1 | 5/2009 | Nakajima et al. |
| 2009/0219300 | A1 | 9/2009 | Peleg et al. |

FOREIGN PATENT DOCUMENTS

| | | |
|---|---|---|
| JP | A-H06-111167 | 4/1994 |
| JP | A-H06-346130 | 12/1994 |
| JP | A 2001-028726 | 1/2001 |
| JP | A-2006-313511 | 11/2006 |
| JP | A-2006-319714 | 11/2006 |
| JP | A-2006-338368 | 12/2006 |
| JP | A-2006-345316 | 12/2006 |

OTHER PUBLICATIONS

Rev-Acha et al. "Making a long video short: dynamic video synopsis", IEEE Proceedings of the Conference on Computer Vision and Pattern Recognition, vol. 1, Jun. 17-22, 2006, pp. 435-441.

(Continued)

*Primary Examiner* — Yubin Hung
(74) *Attorney, Agent, or Firm* — Oliff PLC

(57) ABSTRACT

An image processing method of the present invention includes a detection step detecting a characteristic area from each of three or more shot images having a common graphic pattern in part thereof, the characteristic area having an image significantly different from the other shot images, and a combining step extracting a partial image located in the characteristic area from each of the three or more shot images and combining these partial images into one image.

11 Claims, 7 Drawing Sheets

(56) References Cited

OTHER PUBLICATIONS

Assa et al. "Action synopsis; pose selection and illustration", ACM, 2005, pp. 667-676.

Irani et al. "Efficient representations of video sequences and their applications", Signal Processing: Image Communication 8, 1996, pp. 327-351.

Office Action issued in Japanese Patent Office Application No. 2007-034912 on May 17, 2011. (with English language translation).

* cited by examiner

Fig.2
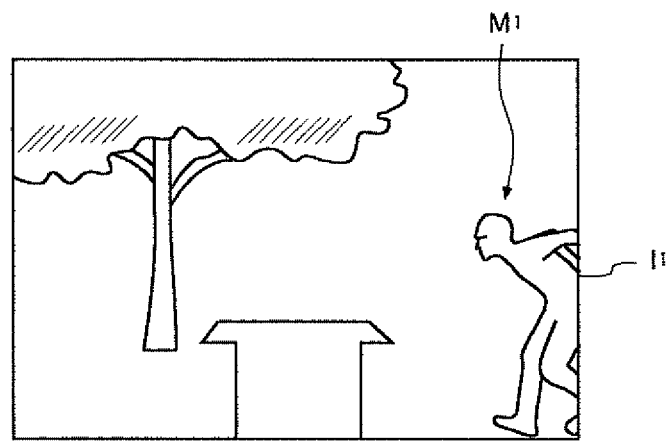
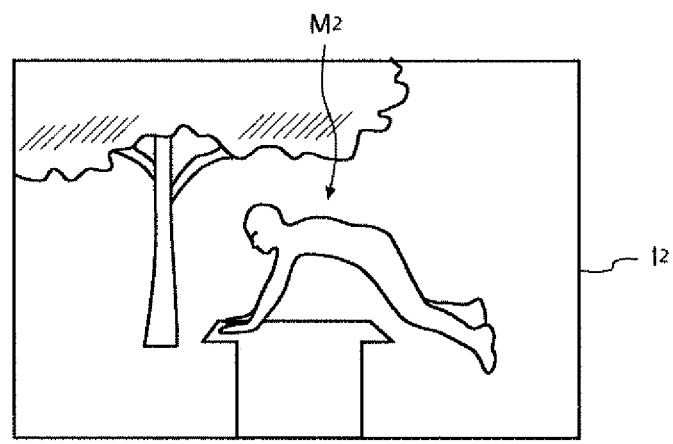
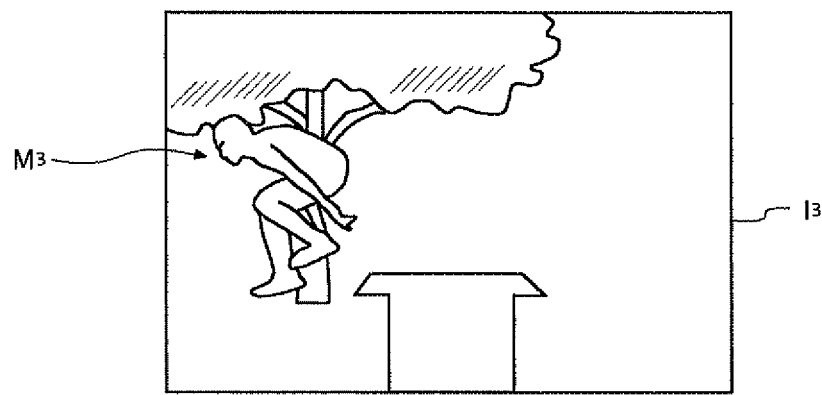

IMAGE PROCESSING METHOD AND IMAGE PROCESSING APPARATUS FOR COMBINING THREE OR MORE IMAGES, AND ELECTRONIC CAMERA HAVING IMAGE PROCESSING APPARATUS FOR COMBINING THREE OR MORE IMAGES

CROSS-REFERENCE TO RELATED APPLICATION

This application is a continuation of U.S. patent application Ser. No. 13/067,772, filed Jun. 24, 2011, which in turn is a continuation of U.S. application Ser. No. 12/068,431 filed on Feb. 6, 2008 which claims priority to Japanese Patent Application No. 2007-034912, filed on Feb. 15, 2007 The disclosure of the prior applications is hereby incorporated by reference herein in its entirety

BACKGROUND

1. Field

The present invention relates to an image processing method for image combining, an image processing apparatus provided with an image combining function, and an electronic camera provided with an image combining function.

2. Description of the Related Art

Patent reference 1 (Japanese Unexamined Patent Application Publication No. 2001-28726) discloses an electronic camera provided with an image combining function. The principle of the function is additive average combining of multiple shot images obtained by, for example, continuous shooting. Shooting continuously a moving object (dynamic body) using a tripod and image-combining the obtained multiple shot images allow a still background and a trajectory of the dynamic body to be included in one image.

It should be noted that this image combining does not discriminate the dynamic body from the background and the background is also included in the dynamic body area, and thereby the dynamic body appears to be transparent. To perform combining to make a dynamic body opaque (hereinafter, called "opaque combining"), it is necessary to detect a presence area of dynamic body from each of the shot images and to connect the areas.

However, it is difficult to detect a presence area of dynamic body automatically, and therefore it is currently difficult to realize automatic opaque combining.

SUMMARY

The present invention provides an image processing method capable of performing opaque combining of shot images without fail. The present invention further provides an image processing apparatus and an electronic camera capable of performing opaque combining of shot images without fail.

An image processing method of the present invention includes a detecting step detecting a characteristic area from each of three or more shot images having a common graphic pattern in part thereof, the characteristic area having an image significantly different from the other shot images, and a combining step extracting a partial image located in the characteristic area from each of the three or more shot images and combining these partial images into one image.

Here, the detecting step preferably assumes, in each of the three or more shot images, an area which has an image significantly different from an averaged image of the other shot images as the characteristic area.

Also, the detecting step preferably generates a distribution map of the characteristic area detected from each of the three or more shot images, and the combining step preferably performs the extraction according to the distribution map.

Also, the detecting step preferably performs filter processing on the distribution map for smoothing distribution boundaries.

Also, the combining step may perform weighted average on the partial image extracted from each of the three or more shot images and partial images extracted from the same areas in the other shot images.

Also, the combining step may set a weight of the weighted averaging to be a value specified by a user.

Also, the detecting step preferably performs the detection, instead of using the three or more shot images, using reduced-size versions thereof.

Further, an image processing apparatus of the present invention includes a detecting unit that detects a characteristic area from each of three or more shot images, the characteristic area having an image significantly different from the other shot images, and a combining unit that extracts a partial image located in the characteristic area from each of the three or more shot images and combines these partial images into one image.

Also, the detecting unit preferably assumes, in each of the three or more shot images, an area which has an image significantly different from an averaged image of the other shot images as the characteristic area.

Also, the detecting unit preferably generates a distribution map of the characteristic area detected from each of the three or more shot images and the combining unit preferably performs the extraction according to the distribution map.

Also, the detecting unit preferably performs filter processing on the distribution map for smoothing distribution boundaries.

Also, the combining unit may perform weighted average on the partial image extracted from each of the three or more shot images and partial images extracted from the same areas in the other shot images.

Also, the combining unit may set a weight of the weighted averaging to be a value specified by a user.

Also, the detecting unit preferably performs the detection, instead of using the three or more shot images, using reduced-size versions thereof.

Further, an electronic camera of the present invention includes an imaging unit that shoots an object to obtain a shot image and any one of the image processing apparatus of the present invention to process three or more shot images obtained by the imaging unit.

BRIEF DESCRIPTION OF THE DRAWINGS

FIG. 2 is a diagram illustrating examples of shot images specified by a user;

DETAILED DESCRIPTION OF EMBODIMENTS

Hereinafter, an embodiment of the present invention will be described. The present embodiment is an embodiment for an electronic camera.

First, a configuration of an electronic camera will be described.

Figure 1:
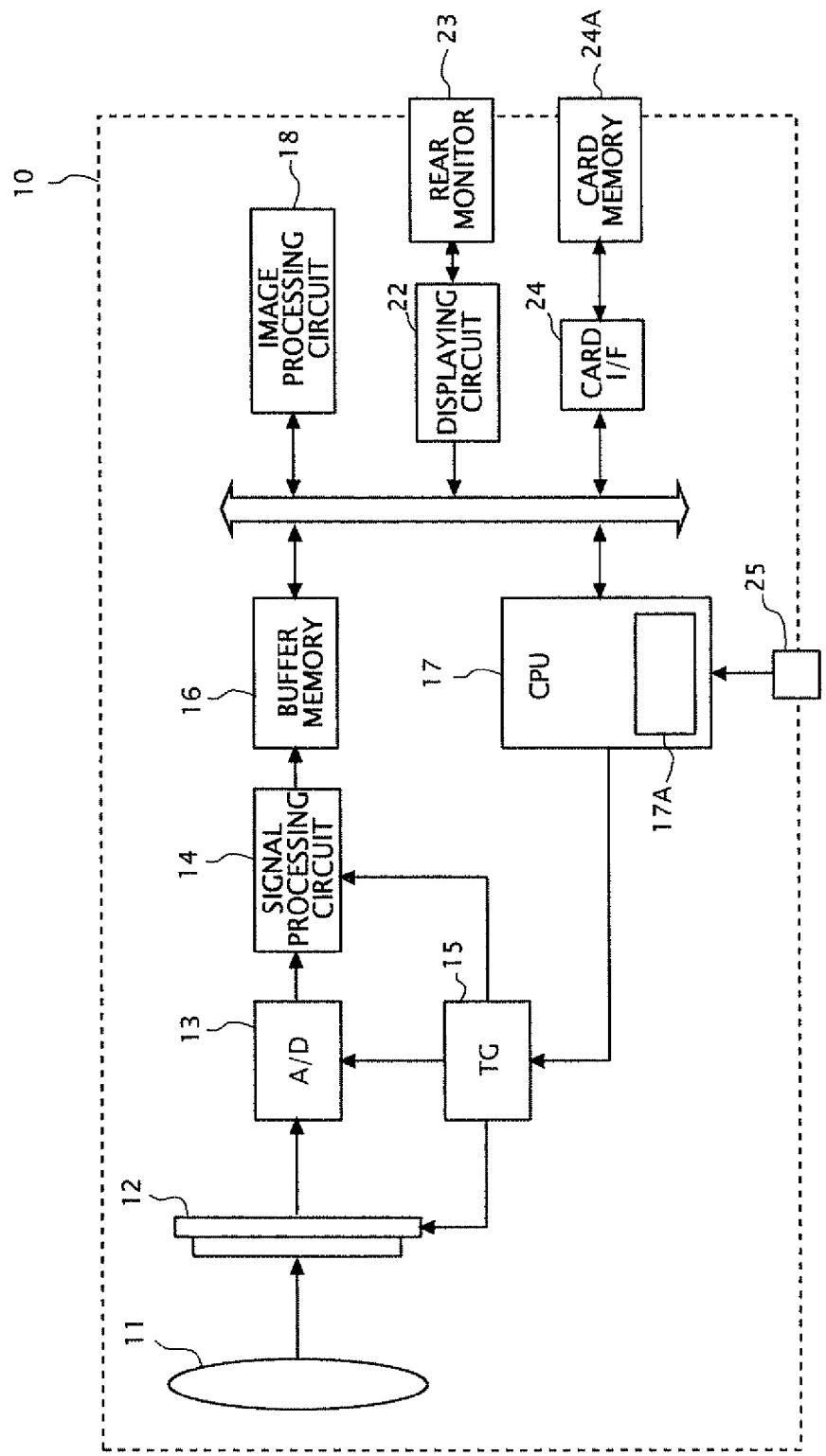
FIG. 1 is a diagram illustrating a configuration of an electronic camera.

FIG. 1 is a diagram illustrating the configuration of the electronic camera. As shown in FIG. 1, an electronic camera 10 includes a shooting lens 11, an imaging sensor 12, an A/D converter 13, a signal processing circuit 14, a timing generator (TG) 15, a buffer memory 16, a CPU 17, an image processing circuit 18, a displaying circuit 22, a rear monitor 23, a card interface (card I/F) 24, an operating button 25, etc., and a card memory 24A is attached to the card interface 24. Among these, the CPU 17 is capable of performing image-combine processing (to be described below). In the following description, it is assumed that a combine-processing part 17A performing the image-combine processing is included in the CPU 17.

The CPU 17 is connected to the buffer memory 16, the image processing circuit 18, the displaying circuit 22, and the card interface 24 via a bus 19. The CPU 17 sends image data to the image processing circuit 18 by use of the bus 19 and thereby performs normal image processing on a shot image such as pixel interpolation processing and color conversion processing. Also, the CPU 17 sends the image data to the rear monitor 23 via the displaying circuit 22, and thereby displays various images on the rear monitor 23. Further, the CPU 17 writes an image file into the card memory 24A and reads the image file out of the card memory 24A via the card interface 24.

Further, the CPU 17 is connected to the timing generator 15 and the operating button 25. The CPU 17 drives the imaging sensor 12, the A/D converter 13, the signal processing circuit 14, etc. via the timing generator 15, and also recognizes various indications such as mode switching provided by a user via the operating button 25. Hereinafter, the electronic camera 10 is assumed to have a shooting mode, an editing mode, and the like.

Next, operation of the CPU 17 in the shooting mode will be described.

When the electronic camera 10 is set to be in the shooting mode, the user enters a shooting indication into the CPU 17 by manipulating the operating button 25. The shooting indications include a single shooting indication and a continuous shooting indication, and the CPU 17 discriminates the both indications based on a push-down period length of the operating button 25, and the like.

When the single shooting indication is entered, the CPU 17 drives the imaging sensor 12, the A/D converter 13 and the signal processing circuit 14 once, and obtains an image signal (image data) for one frame of a shot image. The obtained image data is stored in the buffer memory 16.

At this time, the CPU 17 sends the image data of the shot image stored in the buffer memory 16 to the image processing circuit 18 and performs the normal image processing on the shot image, and also generates an image file of the processed shot image to write the image file into the card memory 24A. Thereby the single shooting is completed. Here, the image file has an image storing area and a tag area, and the image data of the shot image is written in the image storing area and information accompanying the shot image is written in the tag area. The accompanying information includes a reduced-size version of image data of a shot image (image data of a thumbnail image).

On the other hand, when the continuous shooting indication is entered, the CPU 17 continuously drives the imaging sensor 12, the A/D converter 13, and the signal processing circuit 14 multiple times, and obtains an image signal (image data) for multiple frames of shot images. The obtained image data is stored in the buffer memory 16.

At this time, the CPU 17 sends the image data of the shot images stored in the buffer memory 16 to the image processing circuit 18 and performs the normal image processing on the shot image, and also generates an image file of the processed shot image to write the image file into the card memory 24A. After this operation has been performed for multiple frames of the shot images, the continuous shooting is completed. Here, each of the image files has an image storing area and a tag area, and the image data of the shot image is written in the image storing area and information accompanying the shot image is written in the tag area. The accompanying information includes a reduced-size version of image data of a shot image (image data of a thumbnail image).

Next, operation of the CPU 17 in the editing mode will be described.

When the electronic camera 10 is set to be in the editing mode, the CPU 17 displays a menu of the editing mode on the rear monitor 23. One of the menu items is "image combining". This image combining is an image combining capable of the opaque combining.

While the menu is displayed, the user manipulates the operating button 25 to specify a desired item of the menu to the CPU 17. When the user specifies "image combining", the CPU 17 reads out the image files in the card memory 24A, and sends the image data of the thumbnail images added to the image files to the displaying circuit 22. Thereby, shot images previously obtained are reproduced and displayed on the rear monitor 23. In this reproducing display, a plurality of shot images is preferably displayed in parallel at the same time on the rear monitor 23 so that the user can compare a plurality of the shot images to one another.

While the shot images are reproduced and displayed, the user manipulates the operating button 25 to specify to the CPU 17 desired N shot images $I_k$ (k=1, 2, ..., N) among the shot images reproduced and displayed. Then, the user manipulates the operating button 25 to specify an opacity $\alpha_k$ (k=1, 2, ..., N) of a dynamic body included in each of the specified N shot images $I_k$ (k=1, 2, ..., N). The opacity $\alpha_k$ is an opacity of a dynamic body $M_k$ included in the shot image $I_k$.

Here, the N shot images $I_k$ (k=1, 2, ..., N) specified by the user have a part common to one another (background) except for a dynamic bodies $M_k$ (k=1, 2, ..., N) as shown in FIG. 2. Such shot images $I_k$ (k=1, 2, ..., N) are obtained under common shooting conditions (shooting sensitivity, shutter speed, aperture value, and framing).

In the present embodiment, these N shot images $I_k$ (k=1, 2, ..., N) need not include a shot image in which the dynamic body $M_k$ is not present, but, instead, the number of shot images N is required to be three or more.

Also, pixel coordinates of the dynamic bodies $M_k$ (k=1, 2, ..., N) included in each of the shot images $I_k$ (k=1, 2, ..., N) preferably do not overlap with one another. This is because image combining calculation in the present embodiment assumes that pixel coordinates do no overlap.

Also, a range of an opacity $\alpha_k$ (k=1, 2, ..., N) which a user can specify is $0 \leq \alpha_k \leq 1$. For example, for the opaque combining, the user only needs to specify the opacity $\alpha_k$ as $\alpha_1=\alpha_2=\alpha_3=\ldots=\alpha_N=1$, and for erasing all the dynamic bodies from a combined image, specify the opacity $\alpha_k$ as $\alpha_1=\alpha_2=\alpha_3=\ldots=\alpha_N=0$.

When the opacity $\alpha_k$ is specified as above, the CPU 17 sends image data of the specified N shot images $I_k$ (k=1, 2, ..., N) to the combine-processing part 17A and performs image-combine processing on the shot images. The CPU 17 obtains one combined image by this image-combine processing, and then displays the combined image on the rear monitor 23. The CPU 17 also newly generates an image file of the combined image and writes the image file into the memory card 24A.

Next, operation of the combine-processing part 17A will be described in detail.

For simplicity of the description, specified shot images are assumed to be three shot images $I_1$, $I_2$, and $I_3$ shown in FIG. 2. In this case, the number of shot images N is three. Also, each shot image $I_k$ is assumed to have a Y component, a Cb component, and a Cr component.

Accordingly, in the description, the Y component of a shot image $I_k$ is denoted by $Y_k$, the Cb component of a shot image $I_k$ is denoted by $Cb_k$, and the Cr component of a shot image $I_k$ is denoted by $Cr_k$. Also in the description, a pixel value of an arbitrary image X at a pixel coordinates (i, j) is denoted by X(i, j) and the origin of the pixel coordinates (i, j) is determined to be at upper left corner of an image.

Figure 3:
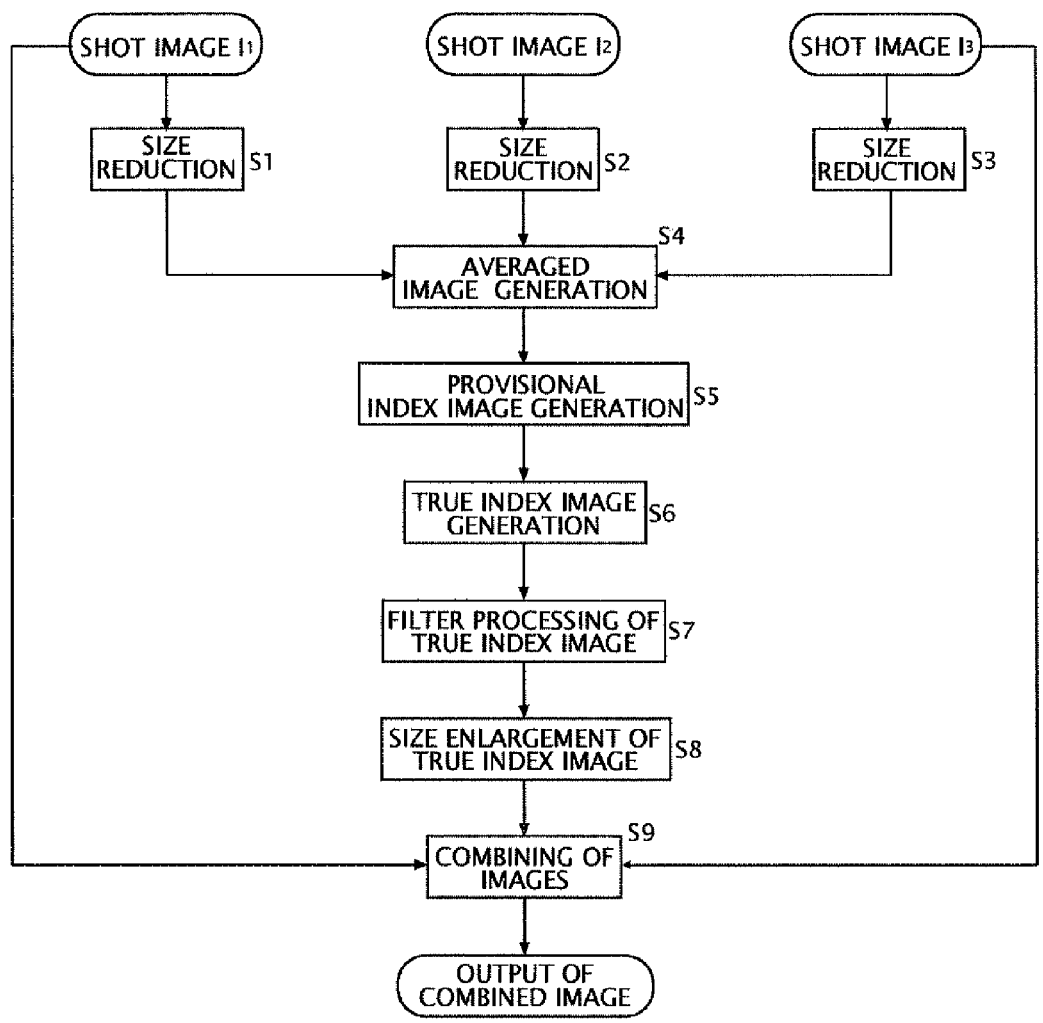
FIG. 3 is an operational flowchart of a combine-processing part 17A.

FIG. 3 is an operational flowchart of the combine-processing part 17A. Each step thereof will be described in sequence as follows.

(Steps S1 to S3)

The combine-processing part 17A performs size reduction processing on each of the shot images $I_1$, $I_2$, and $I_3$ in order to improve processing speed of the image-combine processing. For achieving a size reduction ratio of 16, the size reduction processing is performed using the following formulas, for example.

$$Y_k(i,j) = \left(\sum_{y=4j}^{4j+3}\sum_{jx=4i}^{4i+3} Y_k(x,y)\right)/16 \quad \text{(Formula 1)}$$

$$Cb_k(i,j) = \left(\sum_{y=4j}^{4j+3}\sum_{jx=4i}^{4i+3} Cb_k(x,y)\right)/16$$

$$Cr_k(i,j) = \left(\sum_{y=4j}^{4j+3}\sum_{jx=4i}^{4i+3} Cr_k(x,y)\right)/16$$

(Step S4)

The combine-processing part 17A generates an average image $I_{ave}$ of the shot images $I_1$, $I_2$, and $I_3$ after the size reduction processing. $Y_{ave}$: the Y component of the average image $I_{ave}$, $Cb_{ave}$: the Cb component of the average image $I_{ave}$, and $Cr_{ave}$: the Cr component of the average image $I_{ave}$, are calculated by the following formulas.

$$Y_{ave}(i,j) = \left(\sum_{k=1}^{N} Y_k(i,j)\right)/N \quad \text{(Formula 2)}$$

$$Cb_{ave}(i,j) = \left(\sum_{k=1}^{N} Cb_k(i,j)\right)/N$$

$$Cr_{ave}(i,j) = \left(\sum_{k=1}^{N} Cr_k(i,j)\right)/N$$

(Step S5)

The combine-processing part 17A generates an index image $Y_{index}$ of the Y of component, an index image $Cb_{index}$ of the Cb component, and an index image $Cr_{index}$ of the Cr component as provisional index images, respectively.

Representing these index images, a generation step of the index image $Y_{index}$ will be described.

Figure 4:
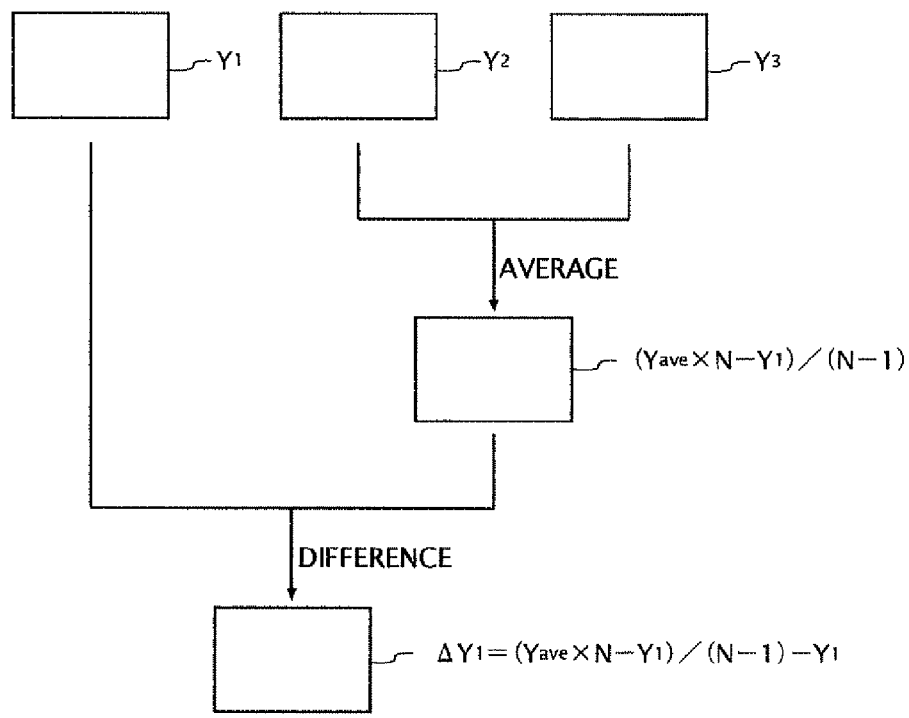
FIG. 4 is a diagram illustrating generating steps of an index image (up to difference image calculation)

First, the combine-processing part 17A focuses on the shot image $I_1$ as shown in FIG. 4, and calculates a difference image $\Delta Y_1$ between the Y component image $Y_1$ of the focused shot image $I_1$ and an average image of the Y components $Y_2$ and $Y_3$ of the other shot images $I_2$ and $I_3$.

Similarly, the combine-processing part 17A focuses on the shot image $I_2$, and calculates a difference image $\Delta Y_2$ between the Y component image $Y_2$ of the focused shot image h and an average image of the Y components $Y_1$ and $Y_3$ of the other shot images $I_1$ and $I_3$.

Similarly, the combine-processing part 17A focuses on the shot image $I_3$, and calculates a difference image $\Delta Y_3$ between the Y component image $Y_3$ of the focused shot image $I_3$ and an average image of the Y components $Y_1$ and $Y_2$ of the other shot images $I_1$ and $I_2$.

Thereby, the difference image $\Delta Y_1$ regarding the shot image $I_1$, the difference image $\Delta Y_2$ regarding the shot image h, and the difference image $\Delta Y_3$ regarding the shot image $I_3$ are obtained. Here, the difference images $\Delta Y_1$, $\Delta Y_2$, and $\Delta Y_3$ are calculated using the following formula.

$$\Delta Y_k(i,j) = |(Y_{ave}(i,j) \times N - Y_k(i,j))/(N-1) - Y_k(i,j)| \quad \text{(Formula 3)}$$

In this formula, "k" is an image number of a focused shot image, and $(Y_{ave} \times N - Y_k)/(N-1)$ is the average image of the other shot images.

Figure 5:
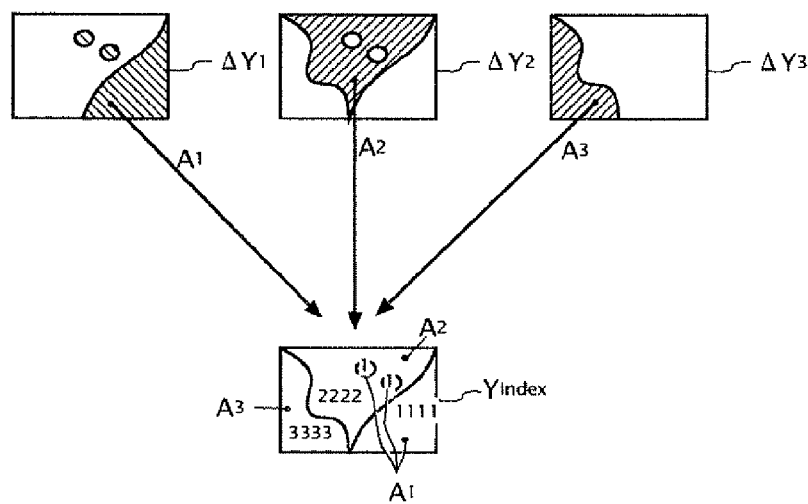
FIG. 5 is a diagram illustrating generating steps of an index image (up to index image calculation)

Subsequently, the combine-processing part 17A compares the difference images $\Delta Y_1$, $\Delta Y_2$, and $\Delta Y_3$ for every pixel coordinates as shown in FIG. 5.

Then, the combine-processing part 17A determines an area as a characteristic area $A_1$, the area being in the difference image $\Delta Y_1$ and whose pixel value is larger than the pixel values of the same areas in the other difference images $\Delta Y_2$, and $\Delta Y_3$. This characteristic area $A_1$ is an area having an outstanding pixel value in the shot image $I_1$ compared with the other shot images $I_2$ and $I_3$. Therefore, this characteristic area $A_1$ can be assumed to be a presence area of a dynamic body $M_1$.

Also, the combine-processing part 17A determines an area as a characteristic area $A_2$, the area being in the difference image $\Delta Y_2$ and whose pixel value is larger than the pixel values of the same areas in the other difference images $\Delta Y_1$, and $\Delta Y_3$. This characteristic area $A_2$ is an area having an outstanding pixel value in the shot image $I_2$ compared with the other shot images $I_1$ and $I_3$. Therefore, this characteristic area $A_2$ can be assumed to be a presence area of a dynamic body $M_2$.

Also, the combine-processing part 17A determines an area as a characteristic area $A_3$, the area being in the difference image $\Delta Y_3$ and whose pixel value is larger than the pixel values of the same areas in the other difference images $\Delta Y_1$, and $\Delta Y_2$. This characteristic area $A_3$ is an area having an outstanding pixel value in the shot image $I_3$ compared with the other shot images $I_1$ and $I_2$. Therefore, this characteristic area $A_3$ can be assumed to be a presence area of a dynamic body $M_3$.

Then, the combine-processing part 17A generates one index image $Y_{index}$ as a distribution map of these characteristic areas $A_1$, $A_2$, and $A_3$.

The characteristic area $A_1$ in this index image $Y_{index}$ is provided with a pixel value "1" as same as the image number of the shot image $I_1$ and the dynamic body $M_1$, the characteristic area $A_2$ in the index image $Y_{index}$ is provided with a pixel value "2" as same as the image number of the shot image $I_2$ and the dynamic body $M_2$, and the characteristic area $A_3$ in the index image $Y_{index}$ is provided with a pixel value "3" as same as the image number of the shot image $I_3$ and the dynamic body $M_3$.

Such an index image $Y_{index}$ is calculated by use of the following formula.

$$Y_{index}(i,j) = k\text{-of-max}[\Delta Y_1(i,j), \ldots, \Delta Y_N(i,j)] \quad \text{(Formula 4)}$$

In this formula, $k\text{-of-max}[x_1, x_2, \ldots, x_N]$ is an element number k of the largest element $x_k$ among N elements $x_1$, $x_2$, ..., $x_N$.

Figure 6:
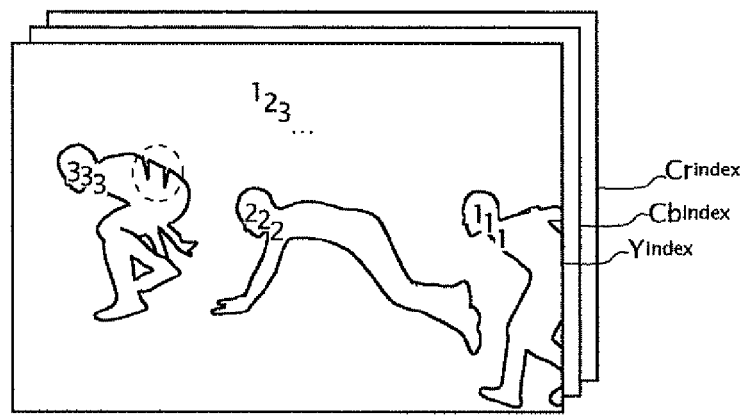
FIG. 6 is a diagram illustrating an index image $Y_{index}$.

FIG. 6 is a diagram illustrating the index image $Y_{index}$. As shown in FIG. 6, in the index image $Y_{index}$, many pixels located in the presence area of the dynamic body $M_1$ (refer to FIG. 2) have a pixel value "1", many pixels located in the presence area of the dynamic body $M_2$ (refer to FIG. 2) have a pixel value "2", and many pixels located in the presence area of the dynamic body $M_3$ (refer to FIG. 2) have a pixel value "3". Meanwhile, in the other areas in the index image $Y_{index}$, a pixel having a pixel value "1", a pixel having a pixel value "2", and a pixel having a pixel value "3" are mixed.

Therefore, a distribution relationship among the dynamic bodies $M_1$, $M_2$, and $M_3$ (refer to FIG. 2) is reflected to the index image $Y_{index}$ with a certain accuracy. Using this index image $Y_{index}$ enables the dynamic bodies $M_1$, $M_2$, and $M_3$ to be extracted from the shot images $I_1$, $I_2$, and $I_3$, respectively.

However, in this index image $Y_{index}$ there exists an indefinite portion such as a portion enclosed by a dotted line in FIG. 6. The reason is probably that the luminance of a part of the dynamic body $M_3$ (refer to FIG. 2) is close to the luminance of the background and false detection occurred so that this part was determined to be the characteristic area $A_1$ or the characteristics area $A_2$, rather than determined to be the characteristic area $A_3$.

Accordingly, the combine-processing part 17A in the present step performs the following processing when detecting the characteristic areas $A_1$, $A_2$, and $A_3$ in the calculation of the index image $Y_{index}$ (refer to FIG. 5).

That is, the combine-processing part 17A compares pixel values in the characteristic area $A_1$ of the difference image $\Delta Y_1$, the characteristic area $A_2$ of the difference image $\Delta Y_2$, and the characteristic area $A_3$ of the difference image $\Delta Y_3$ with a threshold value thY, and assumes an area having pixel value smaller than the threshold value thY to be a particular area $A_0$ which does not belong to any of the characteristic areas $A_1$, $A_2$, and $A_3$. Then, the combine-processing part 17A assigns the particular area $A_0$ of the index image $Y_{index}$ with a particular value except for "1", "2", and "3" (hereinafter, "0"). This particular value is replaced with an appropriate value in the next step.

In the present step, the index image $Cb_{index}$ of the Cb component and the index image $Cr_{index}$ of the Cr component are also generated, and this is performed for the purpose of this replacement.

Here, the index image $Cb_{index}$ is calculated by use of the following formulas.

$$\Delta Cb_k(i,j) = |(Cb_{ave}(i,j) \times N - Cb_k(i,j))/(N-1) - Cb_k(i,j)|$$

$$Cb_{index}(i,j) = k\text{-of-max}[\Delta Cb_1(i,j), \ldots, \Delta Cb_N(i,j)] \quad \text{(Formula 5)}$$

Also, when calculating this index image $Cb_{index}$, the combine-processing part 17A performs the following processing.

That is, the combine-processing part 17A compares pixel values in a characteristic area $A_1$ of a difference image $\Delta Cb_1$, a characteristic area $A_2$ of a difference image $\Delta Cb_2$, and a characteristic area $A_3$ of a difference image $\Delta Cb_3$ with a threshold value thCb, and assumes an area having a pixel value smaller than the threshold value thCb to be a particular area $A_o$ which does not belong to any of the characteristic areas $A_1$, $A_2$, and $A_3$. Then the combine-processing part 17A assigns the particular area $A_o$ in the index image $Cb_{index}$ with a particular value except for "1", "2", and "3" (hereinafter, "0").

Also, the index image $Cr_{index}$ is calculated by use of the following formulas, $$\Delta Cr_k(i,j) = |(Cr_{ave}(i,j) \times N - Cr_k(i,j))/(N-1) - Cr_k(i,j)|$$

$$Cr_{index}(i,j) = k\text{-of-max}[\Delta Cr_1(i,j), \ldots, \Delta Cr_N(i,j)] \quad \text{(Formula 6)}$$

Also, when calculating this index image $Cr_{index}$, the combine-processing part 17A performs the following processing.

That is, the combine-processing part 17A compares pixel values in a characteristic area $A_1$ of a difference image $\Delta Cr_1$, a characteristic area $A_2$ of a difference image $\Delta Cr_2$, and characteristic area $A_3$ of a difference image $\Delta Cr_3$ with a threshold value thCr, and assumes an area having a pixel value smaller than the threshold value thCr to be a particular area $A_0$ which does not belong to any of the characteristic areas $A_1$, $A_2$, and $A_3$. Then the combine-processing part 17A assigns the particular area $A_0$ in the index image $Cr_{index}$ with a particular value except for "1", "2", and "3" (hereinafter, "0").

(Step S6)

The combine processing part 17A determines whether a pixel having the particular value "0" exists in the index image $Y_{index}$, and, if it exists, replaces the pixel value with a pixel value at the same pixel coordinates in the index image $Cb_{index}$.

Figure 7:
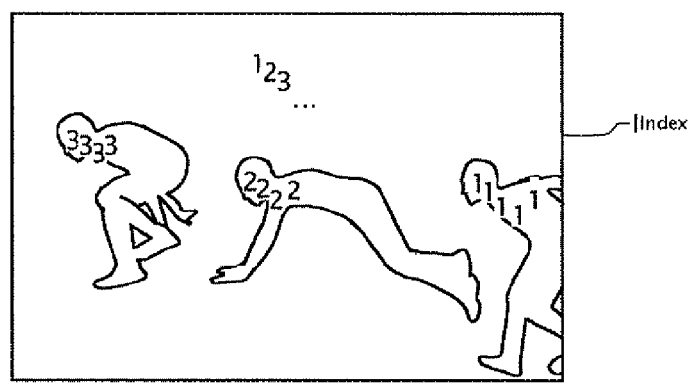
FIG. 7 is a diagram illustrating a true index image $I_{index}$.

Further, the combine-processing part 17A determines whether a pixel having the particular value "0" remains in the index image $Y_{index}$ after the replacement, and if it remains, replaces the pixel value with a pixel value at the same coordinates in the index image $Cr_{index}$. The index image $Y_{index}$ after these replacements is determined to be a true index image $I_{index}$ (refer to FIG. 7).

Accordingly, in the present step, indefiniteness of the index image $Y_{index}$ is compensated by the other index images $Cb_{index}$ and $Cr_{index}$, and the more definite true index image $I_{index}$ is obtained.

Therefore, even if the luminance of a part of a dynamic body $M_k$ included in a certain shot image $I_k$ is close to the luminance of a background thereof, the true index image $I_{index}$ is compensated to become more definite as long as the color of the part is different from the color of the background.

Here, even in the true index image $I_{index}$ after the compensation, there still remains a possibility that a pixel having a particular value "0" exists. This is because there can exist a part of the dynamic body which is similar to the background thereof in both luminance and color.

(Step S7)

The combine-processing part 17A performs filter processing on the true index image $I_{index}$. A filter used at this time is a filter smoothing boundary lines of the characteristic areas A1, A2, and A3, and, for example, a majority filter of 3×3 pixels, The majority filter has a function to replace a pixel value of a focused pixel with a mode value of pixel values of peripheral pixels thereof.

Here, when the mode value becomes the particular value "0" during this filter processing, the combine-processing part 17A replaces the pixel value of the focused pixel with a second mode value, not the mode value. This replacement eliminates a pixel having the particular value "0" from the true index image $I_{index}$.

Figure 8:
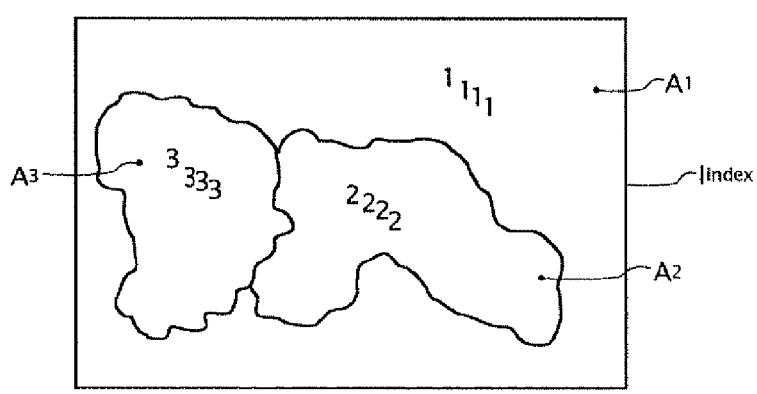
FIG. 8 is a diagram illustrating the true index image $I_{index}$ after filter processing.

The filter processing on the true index image $I_{index}$ may be performed once, but preferably performed appropriate number of times of two or more. As the filter processing is repeated, pixels having the same pixel value (each of the characteristic areas $A_1$, $A_2$, and $A_3$) on the true index image $I_{index}$ gather together gradually. Therefore, in the true index image $I_{index}$ after the filter processing, the characteristic area $A_1$ covers the entire presence area of the dynamic body $M_1$ (refer to FIG. 2), the characteristic area $A_2$ covers the entire presence area of the dynamic body $M_2$ (refer to FIG. 2), and the characteristic area $A_3$ covers the entire presence area of the dynamic body $M_3$ (refer to FIG. 2), as shown in FIG. 8.

In such a true index image $I_{index}$, boundary lines between the characteristic areas $A_1$, $A_2$, and $A_3$ are not always located at a boundary area between the background and the dynamic body $M_1$, a boundary area between the background and the dynamic body $M_2$, or a boundary area between the background and the dynamic body $M_3$, but located definitely in a boundary area between the dynamic body $M_1$ and the dynamic body $M_2$, a boundary area between the dynamic body $M_2$ and the dynamic body $M_3$, and a boundary area between the dynamic body $M_1$ and the dynamic body $M_3$.

Here, in the present step, instead of increase in the number of executions of the filter processing, a filter diameter for the filter processing may be increased.

(Step S8)

The combine-processing part 17A performs size enlargement processing on the true index image $I_{index}$ after the filter processing, and makes a size thereof as same as that of the original shot images $I_1$, $I_2$, and $I_3$. If the size reduction ratio in the steps S1 to S3 described hereinabove is 16, the size enlargement processing uses, for example, the following formulas, where a true index image after the enlargement processing is denoted by $I'_{index}$. In fact, the size enlargement processing using the following formulas is a padding processing.

$$I'_{index}(4j, 4i) = I_{index}(i, j) \quad \text{(Formula 7)}$$
$$I'_{index}(4j, 4i+1) = I_{index}(i, j)$$
$$I'_{index}(4j, 4i+2) = I_{index}(i, j)$$
$$I'_{index}(4j, 4i+3) = I_{index}(i, j)$$
$$I'_{index}(4j+1, 4i) = I_{index}(i, j)$$
$$I'_{index}(4j+1, 4i+1) = I_{index}(i, j)$$
$$\vdots$$
$$I'_{index}(4j+3, 4i+3) = I_{index}(i, j)$$

Here, the true index image after the enlargement processing $I'_{index}$ is used in the next step as a source map for extracting a partial image from each of the shot images $I_1$, $I_2$, and $I_3$.

For this purpose, a pixel value in the true index image $I'_{index}$ should be any one of "1", "2", and "3" and should not be an intermediate value among "1", "2", and "3". Therefore, in the size enlargement processing in the present step, an average interpolation should not be applied, and, if interpolation is applied, it should be a majority interpolation.

(Step S9)

Figure 9:
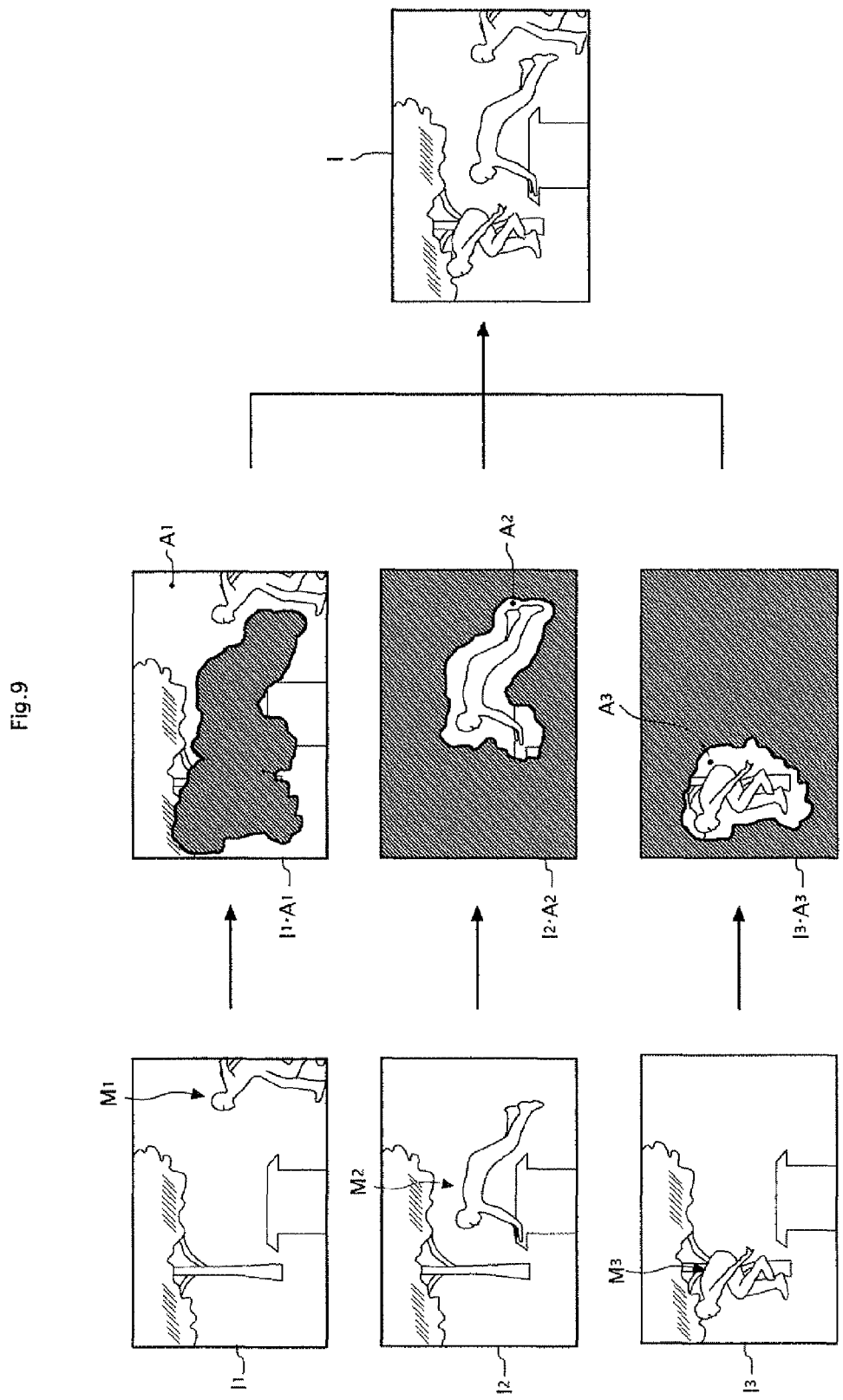
FIG. 9 is a diagram illustrating a combining method based on the true index image $I_{index}$ (in an opacity of 1)

The combine-processing part 17A, on the basis of the true index image $I'_{index}$, extracts a partial image $I_1 \cdot A_1$ located in the characteristic area $A_1$ from the shot image $I_1$, a partial image $I_2 \cdot A_2$ located in the characteristic area $A_2$ from the shot image $I_2$, and a partial image $I_3 \cdot A_3$ located in the characteristic area $A_3$ from the shot image $I_3$, as shown in FIG. 9. Then, the combine-processing part 17A combines the three extracted partial images $I_1 \cdot A_1$, $I_2 \cdot A_2$, and $I_3 \cdot A_3$ to obtain one combined image I. Here, a partial image located in an area A of an image X is represented by X·A.

Figure 10:
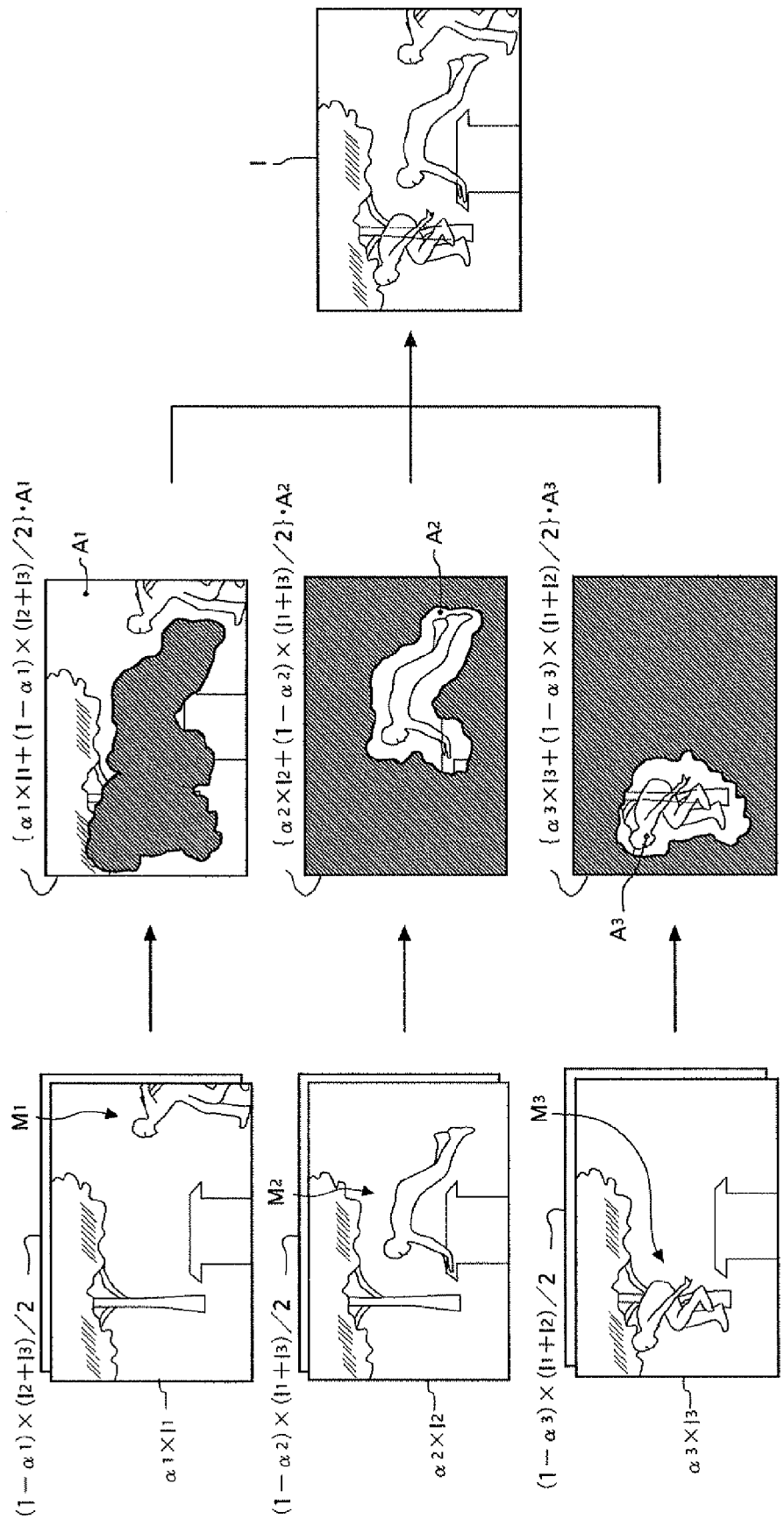
FIG. 10 is a diagram illustrating a combining method based on the true index image $I_{index}$ (in an arbitrary opacity).

At this time, the combine-processing part 17A sets an opacity of the partial image $I_1 \cdot A_1$, an opacity of the partial image $I_2 \cdot A_2$, and an opacity of the partial image $I_3 \cdot A_3$ to be $\alpha_1$, $\alpha_2$, and $\alpha_3$, respectively. These values $\alpha_1$, $\alpha_2$, and $\alpha_3$ are the opacities specified by the user for the dynamic bodies $M_1$, $M_2$, and $M_3$ (refer to FIG. 2). This concept is illustrated as shown in FIG. 10.

That is, regarding the characteristic area $A_1$, weighted averaging is performed on the shot image $I_1$ and an average image $(I_2+I_3)/2$ of the other shot images $I_2$ and $I_3$. A weight ratio of the weighted averaging is set to be $\alpha_1:(1-\alpha_1)$ according to the user's specification.

Focusing on this characteristic area $A_1$, there exists not only the dynamic body $M_1$ but also the background portion in the shot image $I_1$, but the graphic pattern of the background portion is as same as that of the average image $\{(I_2+I_3)/2\}$ of the other shot images $I_2$ and $I_3$. Therefore, a graphic pattern of the characteristic area $A_1$ in the combined image I becomes the background on which the dynamic body $M_1$ is superimposed with an opacity of $\alpha_1$.

Also, regarding the characteristic area $A_2$, weighted averaging is performed on the shot image $I_2$ and an average image $(I_1+I_3)/2$ of the other shot images $I_1$ and $I_3$. A weight ratio of the weighted averaging is set to be $\alpha_2:(1-\alpha_2)$ according to the user's specification.

Focusing on this characteristic area $A_2$, there exists not only the dynamic body $M_2$ but also the background portion in the shot image $I_2$, but the graphic pattern of the background portion is as same as that in the average image $\{(I_1+I_3)/2\}$ of the other shot images $I_1$ and $I_3$. Therefore, a graphic pattern of the characteristic area $A_2$ in the combined image I becomes the background on which the dynamic body $M_2$ is superimposed on with an opacity of $\alpha_2$.

Also, regarding the characteristic area $A_3$, weighted averaging is performed on the shot image $I_3$ and an average image $(I_1+I_2)/2$ of the other shot images $I_1$ and $I_2$. A weight ratio of the weighted averaging is set to be $\alpha_3:(1-\alpha_3)$ according to the user's specification.

Focusing on this characteristic area $A_3$, there exists not only the dynamic body $M_3$ but also the background portion in the shot image $I_3$, but the graphic pattern of the background portion is as same as that in the average image $\{(I_1+I_2)/2\}$ of the other shot images $I_1$ and $I_2$. Therefore, a graphic pattern of the characteristic area $A_3$ in the combined image I becomes the background on which the dynamic body $M_3$ is superimposed with an opacity of $\alpha_3$.

Here, the combining of the shot images $I_1$, $I_2$, and $I_3$ in the present step is performed for each component of the shot images $I_1$, $I_2$, and $I_3$, and the common true index image $I'_{index}$ is used for the combining of each component. When a Y component of the combined image I is denoted by Y, a Cb component of the combined image I is denoted by Cb, and a Cr component of the combined image I is denoted by Cr, combining each component uses the following formulas.

$$k(i,j) = I'_{index}(i,j)$$

$$Y(i,j) = \alpha_{k(i,j)} \times Y_{k(i,j)}(i,j) + (1-\alpha_{k(i,j)}) \times (Y_{ave}(i,j) \times N - Y_{k(i,j)})/(N-1)$$

$$Cb(i,j) = \alpha_{k(i,j)} \times Cb_{k(i,j)}(i,j) + (1-\alpha_{k(i,j)}) \times (Cb_{ave}(i,j) \times N - Cb_{k(i,j)}(i,j))/(N-1)$$

$$Cr(i,j) = \alpha_{k(i,j)} \times Cr_{k(i,j)}(i,j) + (1-\alpha_{k(i,j)}) \times (Cr_{ave}(i,j) \times N - Cr_{k(i,j)}(i,j))/(N-1) \quad \text{(Formula 8)}$$

That is, a pixel value Y (i, j) at a certain pixel coordinates (i, j) of the combined image I is determined to be a weighted-average of a pixel value $Y_1$ (i, j), $Y_2$ (i, j), and $Y_3$ (i, j) at the same pixel coordinates in the shot images $I_1$, $I_2$, and $I_3$ according to a pixel value $I'_{index}$ (i, j) at the same pixel coordinates (i, j) in the true index image $I'_{index}$. For example, when the pixel value $I'_{index}$ (i, j) of the true index image $I'_{index}$ is "1", a weighted average of the pixel value $Y_1$ (i, j) and an average value of the $Y_2$ (i, j) and $Y_3$ (i, j) is calculated with a weight ratio of $\alpha_1:(1-\alpha_1)$. Also, for example, when the pixel value $I'_{index}$ (i, j) of the true index image $I'_{index}$ is "2", a weighted average of the pixel value $Y_2$ (i, j) and an average value of the $Y_1$ (i, j) and $Y_3$ (i, j) is calculated with a weight ratio of $\alpha_2:(1-\alpha_2)$.

Similarly, a pixel value Cr(i, j) of a certain pixel of the combined image I is determined to be a weighted-average of a pixel value $Cr_1$ (i, j), $Cb_2$ (i, j), and $Cb_3$ (i, j) at the same pixel coordinates in the shot images $I_1$, $I_2$, and $I_3$ according to a pixel value $I_{index}$ (i, j) at the same pixel coordinates (i, j) in the true index image $I'_{index}$. For example, when the pixel value $I'_{index}$ (i, j) of the true index image $I'_{index}$ is "1", a weighted average of the pixel value $Cb_1$ (i, j) and an average value of the $Cb_2$ (i, j) and $Cb_3$ (i, j) is calculated with a weight ratio of $\alpha_1:(1-\alpha_1)$. Also, for example, when the pixel value $I'_{index}$ (i, j) of the true index image $I'_{index}$ is "2", a weighted average of the pixel value $Cb_2$ (i, j) and an average value of the $Cb_1$ (i, j) and $Cb_3$ (i, j) is calculated with a weight ratio of $\alpha_2:(1-\alpha_2)$.

Similarly, a pixel value Cr(i, j) of a certain pixel of the combined image I is determined to be a weighted-average of a pixel value $Cr_1$ (i, j), $Cr_2$ (i, j), and $Cr_3$ (i, j) at the same pixel coordinates in the shot images $I_1$, $I_2$, and $I_3$ according to a pixel value $I'_{index}$ (i, j) at the same pixel coordinates (i, j) in the true index image $I'_{index}$. For example, when the pixel value $I'_{index}$ (i, j) of the true index image $I'_{index}$ is "1", a weighted average of the pixel value $Cr_1$ (i, j) and an average value of the $Cr_2$ (i, j) and $Cr_3$ (i, j) is calculated with a weight ratio of $\alpha_1:(1-\alpha_1)$. Also, for example, when the pixel value $I'_{index}$ (i, j) of the true index image $I'_{index}$ is "2", a weighted average of the pixel value $Cr_2$ (i, j) and an average value of the $Cr_1$ (i, j) and $Cr_3$ (i, j) is calculated with a weight ratio of $\alpha_2:(1-\alpha_2)$ (That is the description of the step S9).

As a result, the combine-processing part 17A, while managing opacities of the dynamic bodies M1, M2, and M3 included in the shot images $I_1$, $I_2$, and $I_3$ to be $\alpha_1$, $\alpha_2$, and $\alpha_3$ specified by the user, respectively, can combine these shot images $I_1$, $I_2$, and $I_3$ correctly. When the opacities are set to be "1", the combining may become the opaque combining.

Here, while the user in the present embodiment specified the opacities of all the dynamic bodies, the opacities of some or all of the dynamic bodies may not be specified. In this case, the CPU 17 sets the opacity which is not specified to be a default value (e.g., "1").

Also, although the combine-processing part 17A in the present embodiment eliminated the particular value "0" from the true index image $I_{index}$ during the filtering processing (step S7), the processing associated with this elimination may be omitted. Note that, in this case, the combine-processing part 17A needs to replace the particular value "0" with a non-particular value (any one of "1", "2", and "3") in the end of the step S7.

For example, the combine-processing part 17A replaces the particular value "0" with "1" when the shot image takes priority, the particular value "0" with "2" when the shot image $I_2$ takes priority, and the particular value "0" with "3" when the shot image $I_3$ takes priority. Here, which of the shot images $I_1$, $I_2$, and $I_3$ takes priority may be specified by the user in advance or determined automatically by the combine-processing part 17A through its evaluation of the shot images $I_2$, and $I_3$.

Also, while the combine-processing part 17A in the present embodiment performed the size reduction processing (steps S1 to S3) on the shot images to improve the processing speed in the image-combine processing, the size reduction processing (steps S1 to S3) may be omitted and, instead, the thumbnail image of the shot image (stored in the same image file as the shot image) may be used.

Also, while the combine-processing part 17A in the present embodiment performed the size reduction processing (steps S1 to S3) on the shot images to improve the processing speed in the image-combine processing, the size reduction processing (steps S1 to S3) may be omitted when a slow processing speed does not matter. In this case, the size enlargement processing (step S8) is also omitted.

Although, in the electronic camera 10 of the present embodiment, the whole image-combine processing was performed by the CPU 17, a part or whole of the image-combine processing may be performed by a dedicated circuit except for the CPU 17 or the image processing circuit 18.

Also, some or all of the functions of the image-combine processing in the electronic camera 10 of the present embodiment may be provided in the other apparatus having a user interface and a monitor such as an image storage or a printer.

Also, some or all of the functions of the image-combine processing in the electronic camera 10 of the present embodiment may be performed by a computer. When performed by a computer, a program for the purpose (image-combine processing program) is stored in a memory of the computer (hard disk drive or the like). Install of the image-combine processing program into the hard disk drive is performed, for example, via the Internet or a recording medium such as a CD-ROM.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing method, comprising:
   a detecting step detecting a characteristic area for each of three or more shot images having a common graphic pattern in part thereof, the pixels in the region of one shot image specified by its corresponding characteristic area being significantly different from the pixels in the corresponding region of each of the other shot images;
   a generation step generating a distribution map based on the detected characteristic areas and a threshold such that each pixel of the distribution map has a value that identifies one of the shot images or is a particular value;

a filtering step performing filter processing on the distribution map by replacing a pixel value of a focused pixel with a most common pixel value within a determined neighborhood of said focused pixel if the most common pixel value is not the same as the particular value and replacing the pixel value of the focused pixel with a second most common pixel value in said neighborhood otherwise; and a combining step extracting a partial image from each of the three or more shot images according to the distribution map generated by performing the filter processing and combining these partial images into one image.

2. The image processing method according to claim 1, wherein the detecting step detects the characteristic area for a shot image based on the shot image and the average of the other shot images.

3. The image processing method according to claim 1, wherein
the combining step performs weighted average on the partial image extracted from each of the three or more shot images and partial images extracted from the same areas in the other shot images.

4. The image processing method according to claim 3, wherein
the combining step sets a weight of the weighted averaging to be a value specified by a user.

5. The image processing method according to claim 1, wherein
the detecting step performs the detecting, instead of using the three or more shot images, using reduced-size versions thereof.

6. An image processing apparatus, comprising:
a detecting unit detecting a characteristic area for each of three or more shot images having a common graphic pattern in part thereof, the pixels in the region of one shot image specified by its corresponding characteristic area being significantly different from the pixels in the corresponding region of each of the other shot images,
wherein the detecting unit generates a distribution map based on the detected characteristic areas and a threshold such that each pixel of the distribution map has a value that identifies one of the shot images or is a particular value, and performs filter processing on the distribution map by replacing a pixel value of a focused pixel with a most common pixel value within a determined neighborhood of said focused pixel if the most common pixel value is not the same as the particular value and replacing the pixel value of the focused pixel with a second most common pixel value in said neighborhood otherwise; and a combining unit for extracting a partial image from each of the three or more shot images according to the distribution map generated by performing the filter processing and combining these partial images into one image.

7. The image processing apparatus according to claim 6, wherein the detecting units detects the characteristic area for a shot image based on the shot image and the average of the other shot images.

8. The image processing apparatus according to claim 6, wherein
the combining unit performs weighted average on the partial image extracted from each of the three or more shot images and partial images extracted from the same areas in the other shot images.

9. The image processing apparatus according to claim 8, wherein
the combining unit sets a weight of the weighted averaging to be a value specified by a user.

10. The image processing apparatus according to claim 6, wherein
the detecting unit performs the detecting, instead of using the three or more shot images, using reduced-size versions thereof.

11. An electronic camera, comprising:
an imaging unit that shoots an object to obtain a shot image; and
an image processing apparatus according to claim 6 that processes three or more shot images obtained by the imaging unit.

* * * * *